(12) United States Patent
Todd et al.

(10) Patent No.: US 10,838,965 B1
(45) Date of Patent: Nov. 17, 2020

(54) DATA VALUATION AT CONTENT INGEST

(71) Applicant: EMC Corporation, Hopkinton, MA (US)

(72) Inventors: Stephen Todd, Shrewsbury, MA (US); Jeroen van Rotterdam, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 662 days.

(21) Appl. No.: 15/135,790

(22) Filed: Apr. 22, 2016

(51) Int. Cl.
  *G06F 16/00* (2019.01)
  *G06F 16/2455* (2019.01)
  *G06N 20/00* (2019.01)
  *G06F 16/901* (2019.01)
  *G06F 16/2457* (2019.01)

(52) U.S. Cl.
  CPC .. *G06F 16/24568* (2019.01); *G06F 16/24578* (2019.01); *G06F 16/9024* (2019.01); *G06N 20/00* (2019.01)

(58) Field of Classification Search
  CPC ......... G06F 17/30516; G06F 17/30958; G06F 17/3053; G06F 17/30528; G06N 99/005; G06Q 50/184
  USPC .................................................. 707/723, 792
  See application file for complete search history.

(56) References Cited

U.S. PATENT DOCUMENTS

| | | |
|---|---|---|
| 6,715,145 B1 | 3/2004 | Bowman-Amuah |
| 6,957,227 B2 | 10/2005 | Fogel et al. |
| 7,574,426 B1 | 8/2009 | Ortega |
| 7,580,848 B2 * | 8/2009 | Eder ....................... G06Q 10/06 705/35 |
| 7,752,195 B1 | 7/2010 | Hohwald et al. |
| 7,890,451 B2 | 2/2011 | Cancel et al. |
| 7,970,729 B2 | 6/2011 | Cozzi |
| 8,561,012 B1 | 10/2013 | Holler et al. |
| 9,031,994 B1 * | 5/2015 | Cao ....................... G06F 16/278 707/798 |
| 9,262,451 B1 | 2/2016 | Singh et al. |
| 9,384,226 B1 | 7/2016 | Goel et al. |
| 9,465,825 B2 | 10/2016 | Nelke et al. |
| 9,606,828 B2 | 3/2017 | Ghosh et al. |
| 9,851,997 B2 | 12/2017 | Gough et al. |
| 10,069,749 B1 * | 9/2018 | Narkier ................. G06F 9/5011 |
| 10,296,501 B1 * | 5/2019 | Todd ................... G06F 16/2365 |
| 2001/0042062 A1 * | 11/2001 | Tenev .................. G06F 16/9024 |
| 2004/0122646 A1 | 6/2004 | Colossi et al. |
| 2005/0182739 A1 | 8/2005 | Dasu et al. |
| 2005/0193041 A1 * | 9/2005 | Bourbonnais ......... G06F 16/273 |

(Continued)

OTHER PUBLICATIONS

U.S. Appl. No. 14/863,783 filed in the name of Stephen Todd et al. filed Sep. 24, 2015 and entitled "Unstructured Data Valuation.".

(Continued)

*Primary Examiner* — Hanh B Thai
(74) *Attorney, Agent, or Firm* — Ryan, Mason & Lewis, LLP

(57) ABSTRACT

A data set is ingested by a data storage system. A valuation is calculated for the data set at the time of ingestion by the data storage system. The calculated valuation is stored. In one illustrative example, the data set is ingested by the data storage system as a data stream such that the valuation calculation step is performed on the data set as the data set streams into the data storage system.

20 Claims, 10 Drawing Sheets

(56) References Cited

U.S. PATENT DOCUMENTS

| | | | |
|---|---|---|---|
| 2007/0005383 A1* | 1/2007 | Kasower | G06Q 30/00 705/1.1 |
| 2009/0018996 A1 | 1/2009 | Hunt et al. | |
| 2009/0282089 A1 | 11/2009 | Lakshmanachar et al. | |
| 2009/0327921 A1 | 12/2009 | Holm-Peterson et al. | |
| 2010/0094685 A1* | 4/2010 | Young | G06Q 40/06 705/36 R |
| 2010/0153324 A1 | 6/2010 | Downs et al. | |
| 2011/0055699 A1 | 3/2011 | Li et al. | |
| 2011/0078603 A1* | 3/2011 | Koomullil | G06F 16/248 715/769 |
| 2012/0084261 A1 | 4/2012 | Parab | |
| 2012/0116911 A1* | 5/2012 | Irving | G06Q 30/02 705/26.4 |
| 2012/0123994 A1 | 5/2012 | Lowry et al. | |
| 2012/0310684 A1* | 12/2012 | Carter | G06Q 10/067 705/7.11 |
| 2012/0323843 A1 | 12/2012 | Bice et al. | |
| 2013/0036091 A1 | 2/2013 | Provenzano et al. | |
| 2013/0055042 A1 | 2/2013 | Al Za'noun et al. | |
| 2013/0073594 A1 | 3/2013 | Jugulum et al. | |
| 2013/0110842 A1* | 5/2013 | Donneau-Golencer | G06F 17/30702 707/741 |
| 2013/0151423 A1 | 6/2013 | Schmidt et al. | |
| 2013/0275612 A1* | 10/2013 | Voss | G06F 16/24568 709/231 |
| 2014/0052489 A1 | 2/2014 | Prieto | |
| 2014/0324856 A1 | 10/2014 | Lahiani et al. | |
| 2015/0120555 A1* | 4/2015 | Jung | G06Q 20/40 705/44 |
| 2015/0134591 A1 | 5/2015 | Staeben et al. | |
| 2015/0293974 A1* | 10/2015 | Loo | G06F 16/24568 707/752 |
| 2015/0381426 A1* | 12/2015 | Roese | G06F 9/5077 709/226 |
| 2016/0055184 A1 | 2/2016 | Fokoue-Nkoutche et al. | |
| 2016/0110819 A1 | 4/2016 | Abramowitz | |
| 2016/0196311 A1 | 7/2016 | Wang et al. | |
| 2016/0224430 A1 | 8/2016 | Long et al. | |
| 2017/0116345 A1* | 4/2017 | Cameron | G06F 16/24578 |
| 2017/0236060 A1 | 8/2017 | Ignatyev | |
| 2017/0293655 A1* | 10/2017 | Ananthanarayanan | G06F 17/30557 |

OTHER PUBLICATIONS

U.S. Appl. No. 14/998,112 filed in the name of Stephen Todd et al. filed Dec. 24, 2015 and entitled "Data Valuation Based on Development and Deployment Velocity.".

U.S. Appl. No. 14/973,096 filed in the name of Stephen Todd et al. filed Dec. 17, 2015 and entitled "Data Set Valuation for Service Providers.".

U.S. Appl. No. 14/973,141 filed in the name of Stephen Todd et al. filed Dec. 17, 2015 and entitled "Automated Data Set Valuation and Protection.".

U.S. Appl. No. 14/973,178 filed in the name of Stephen Todd filed Dec. 17, 2015 and entitled "Timeless Metrics and Data Valuation in Distributed Storage Systems.".

U.S. Appl. No. 15/073,741 filed in the name of Stephen Todd et al. filed Mar. 18, 2016 and entitled "Data Quality Computation for Use in Data Set Valuation.".

U.S. Appl. No. 15/072,557 filed in the name of Stephen Todd et al. filed Mar. 17, 2016 and entitled "Metadata-Based Data Valuation.".

U.S. Appl. No. 15/136,327 filed in the name of Stephen Todd et al. filed Apr. 22, 2016 and entitled "Calculating Data Value Via Data Protection Analytics.".

U.S. Appl. No. 15/135,817 filed in the name of Stephen Todd et al. filed Apr. 22, 2016 and entitled "Data Value Structures.".

U.S. Appl. No. 13/923,791 filed in the name of Stephen Todd et al. filed Jun. 21, 2013 and entitled "Data Analytics Computing Resource Provisioning.".

U.S. Appl. No. 14/744,886 filed in the name of Marina Zeldin et al. filed Jun. 19, 2015 and entitled "Infrastructure Trust Index.".

Wikipedia, "Value Chain," https://en.wikipedia.org/w/index.php?title=Value_chain&printable=yes, Jun. 6, 2016, 7 pages.

Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

* cited by examiner

DATA VALUATION AT CONTENT INGEST

FIELD

The field relates generally to data processing and, more particularly, to data set valuation techniques.

BACKGROUND

Valuation algorithms allow owners of content to associate economic or business value to their data assets. This value can then potentially be used as input to a variety of business functions.

By way of one example only, one business function includes insuring data assets against loss. Insuring valuable data against loss (e.g., breach or corruption) has become an important part of risk management for entities that store and/or manage data for clients. Since client data is typically stored in cloud computing platforms, and thus susceptible to online breach by identity thieves and other actors involved in illicit activities, insuring the heavy financial risk faced by an entity that maintains client data has become a necessity. The value placed on a data asset determines the cost of insuring the data.

Of course, valuation of data assets of an entity can be useful in many other business functions. Accordingly, it is realized that techniques for determining accurate value are important.

SUMMARY

Embodiments of the invention provide automated data valuation techniques.

For example, in one embodiment, a method performed by one or more processing devices comprises the following steps. A data set is ingested by a data storage system. A valuation is calculated for the data set at the time of ingestion by the data storage system. The calculated valuation is stored.

Advantageously, illustrative embodiments provide techniques for assigning value during the real-time ingest process for one or more streaming data sources. Such techniques provide early and substantially instant (e.g., contemporaneous) access to the value of ingested content. Data valuation at content ingest is therefore advantageous to many business functions.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"client" illustratively refers to a customer or end user of a data storage system or some other form of cloud computing platform; the client accesses the platform via one or more client processing devices;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data), e.g., documents, free form text, images, etc.; and "metadata" illustratively refers to data that describes other data.

Figure 1:
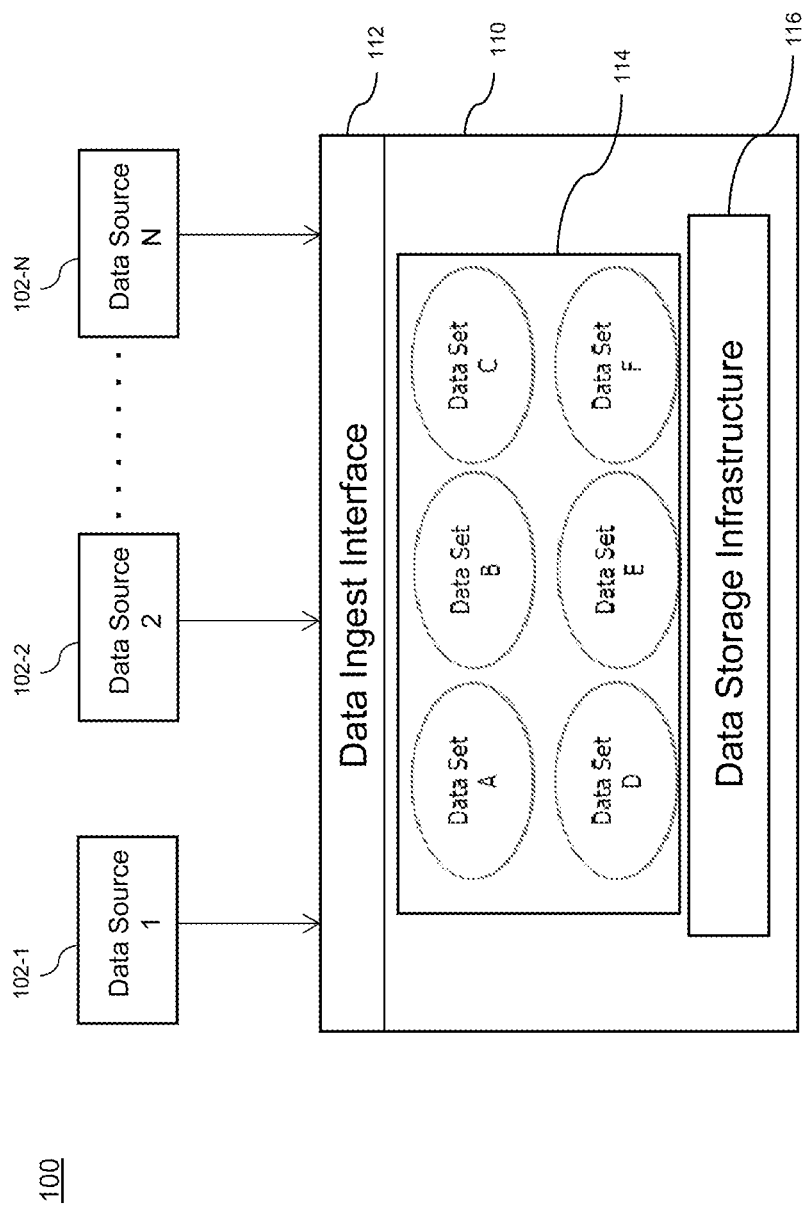
FIG. 1 illustrates a data storage system environment in which embodiments of the invention can be implemented.

FIG. 1 illustrates a data storage system environment in which embodiments of the invention can be implemented. As shown, in data storage system environment 100 (which may be implemented as a cloud computing platform in an illustrative embodiment), data sources 102-1, 102-2, . . . , 102-N provide data to data storage system 110 through a data ingest interface 112. In illustrative embodiments, one or more of the data sources 102-1, 102-2, . . . , 102-N provide streaming data (i.e., data streams). The data storage system 110 comprises a plurality of data sets 114 (data sets A-F) that are stored on data storage infrastructure 116. The data sets 114 comprise the data from the data sources 102 (e.g., data files), but can also include other data. The data sets 114 may each have their own domain-specific data (e.g., customer data, employment data, credit data, etc.) relevant to one or more of data sources 102-1, 102-2, . . . , 102-N. Data storage infrastructure 116 may comprise one or more compute elements (e.g., servers), network elements (e.g., switches, routers) and/or storage elements (e.g., storage devices, storage arrays). Data storage system 110 can be part of a data center managed by a service provider.

The value of data, such as the data from data sources 102-1, 102-2, . . . , 102-N stored as data sets 114, is intrinsically tied to the semantic content of the data. There are valuation techniques that compute the value of data based on its semantic content, examples of which will be described herein below. These techniques can be augmented with various forms of metadata to create richer valuation results. For example, any workflow related to content can be captured and likewise used for calculating an augmented value. In spite of these benefits, there are certain limitations to these existing valuation techniques.

The above-mentioned existing semantic content valuation techniques create a window in time where the content is either unvalued or the value has potentially gone stale. For example, if a content owner wishes to know the value of a file or database that has been recently stored into a file system (or has otherwise not been valued yet), that content owner must wait until some valuation algorithm has been run against the content. This can increase time-to-insight for critical business decisions and result in missed opportunities. Valuation as part of a data backup suffers from even more delays. Valuation during content workflow suffers from the same deficiencies. Valuation delays also impact valuation accuracy since time relevant parameters or related content or data may have changed at the point of valuation.

Running valuation algorithms using the techniques described above can interfere (e.g., cause to run more slowly) with a variety of production activities including, but not limited to normal input/output (I/O) operations, backup/recovery procedures, and content workflow speed. Furthermore, as content is modified, there is no immediate feedback on the fluctuation of its value based on the new data and/or the modification of existing data. This problem is related to the valuation delays described above. Also, these existing valuation techniques lack the ability to provide immediate notification of valuation changes, either when crossing thresholds (e.g., valuation >90 or <10) or percentage rise/drop in value (e.g., >25%), or rise/drop within a time window. These changes can signal the need for immediate business action but they will go unaddressed into the next valuation cycle.

Still further, it is realized herein that the value of a given file A may increase based on the presence of a given file B (or the content of file B). The existing valuation techniques described above do not modify the value of file A should file B be introduced into the storage ecosystem (or should B be added to or modified). This can result in valuation assumptions that are completely out of date.

Techniques that open a file in order to calculate value may be unaware that the file has undergone transformation on ingest. For example, on ingest, a transform can be run that performs masking on certain keywords within the document. Valuation algorithms that discover the mask cannot perform an effective valuation on all of the content. A particularly difficult transformation that impacts valuation is encryption. The owner of the content is not likely to provide the key to a valuation algorithm and therefore the value of the content is unknown.

Further, a file is often unaware of the policies (e.g., retention) or regulations (e.g., Security Exchange Commission regulations) that are associated with it. These business associations could add a rich dimension to value calculations, however, existing valuation algorithms likely will not have access or the ability to discover the associations.

Lastly, given that existing valuation algorithms require that content be initially stored before the value can be calculated, there is no opportunity to initially place content in a location that is most appropriate for its value. This can result in a costly move of the content to position it onto a more appropriate media (e.g., a more trusted infrastructure) once the value has been calculated or it can lead to a temporary increase in risk such as: high value content is not placed on highly protected storage systems; and/or content can be misplaced in a geo-location that exposes content to regulatory risk. In hybrid cloud storage systems, incorrect placement can lead to unnecessary bandwidth usage and/or cloud storage costs.

To overcome these and other drawbacks associated with existing semantic content valuation techniques, illustrative embodiments of the invention provide a framework for calculating valuation on content ingest.

Figure 2:
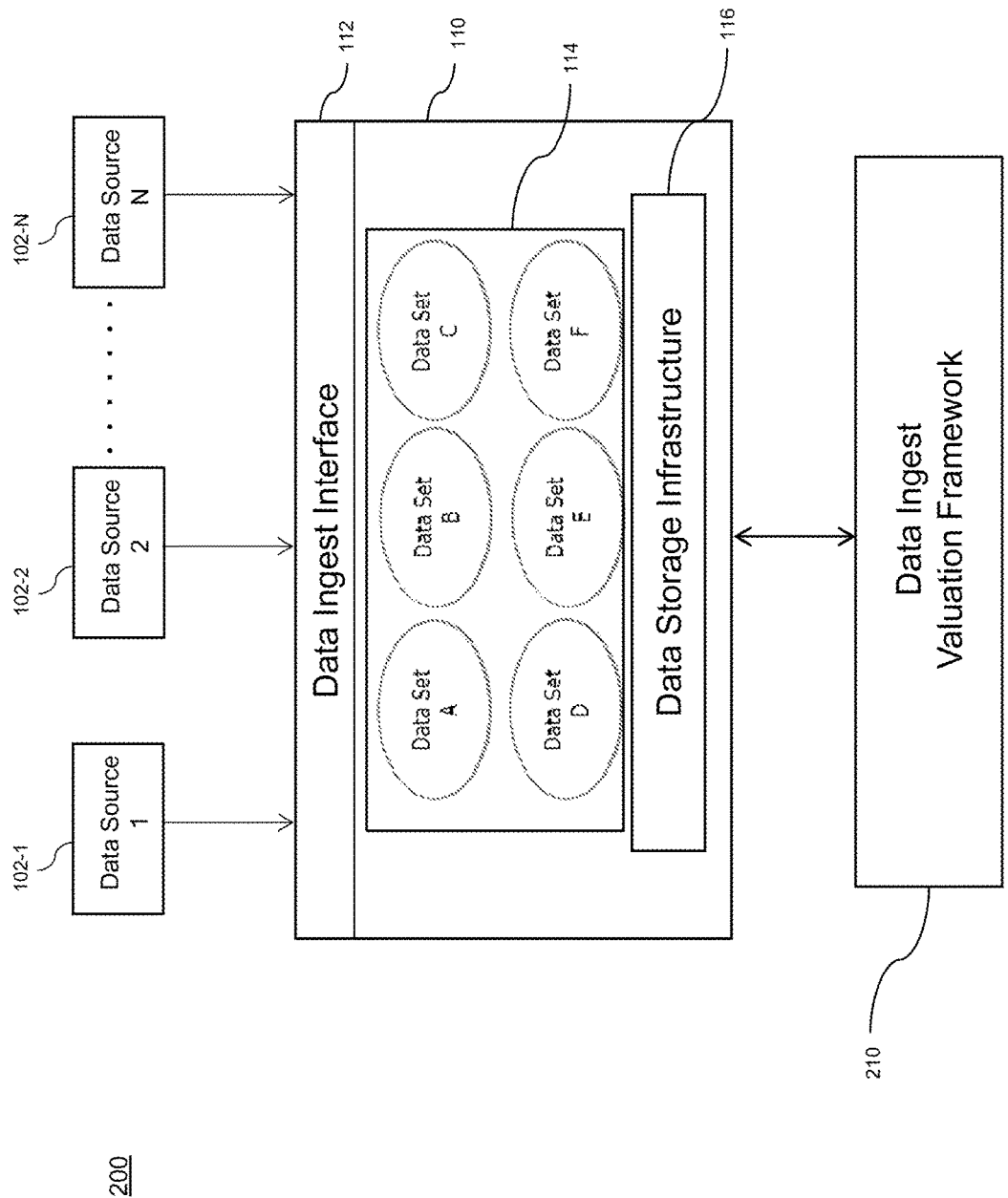
FIG. 2 illustrates a data ingest valuation framework environment according to an embodiment of the invention.

FIG. 2 illustrates such a data ingest valuation framework environment 200 according to an embodiment of the invention. As shown, the data storage system 110 of FIG. 1 is operatively coupled to a data ingest valuation framework 210. Illustrative features of the framework 210 will be described below in the context of FIGS. 3-9. Data ingest valuation framework 210 employs one or more data valuation methodologies for associating value with data at the time of data ingestion by data storage system 110 from data sources 102-1, 102-2, . . . , 102-N.

Figure 3:
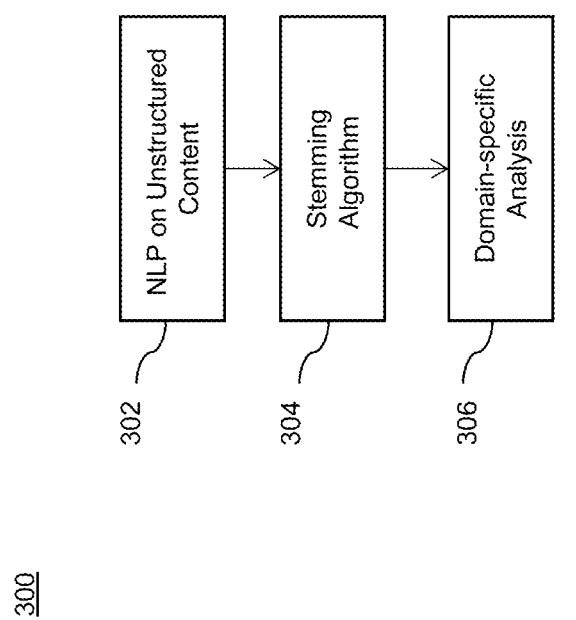
FIG. 3 illustrates a data valuation methodology for unstructured data that can be employed with embodiments of the invention.

By way of one example only, FIG. 3 illustrates a valuation methodology 300 for unstructured data. This methodology is described in the U.S. patent application identified as Ser. No. 14/863,783, entitled "Unstructured Data Valuation," filed on Sep. 24, 2015, the disclosure of which is incorporated by reference herein. More particularly, methodology 300 in FIG. 3 illustrates a data valuation methodology wherein, in step 302, natural language processing (NLP) is performed on the unstructured content. In step 304, a stemming algorithm is performed on the NLP-processed data. The stemming algorithm results in domain-aware tokens. These domain-aware tokens are grouped in subject matter domains. Despite being mapped to domains, the tokens still maintain their identification with the data source from which they were obtained. By way of example only, metadata can be generated, such as an identifier (ID), and associated with (e.g., stored, attached, etc.) a token that identifies the data source from which the token was derived. In step 306, one or more domain-specific analyses are performed on the tokens to calculate and assign value for the tokens based on the specific domain associated with the tokens.

By way of another non-limiting example, one or more of the data valuation models described in D. Laney, "The Economics of Information Assets," The Center for Infonomics, Smarter Companies presentation, September 2011, may be employed as data valuation methodologies used by framework 210. Such valuation models include a set of non-financial models and set of financial models. As shown, the non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

Figure 4:
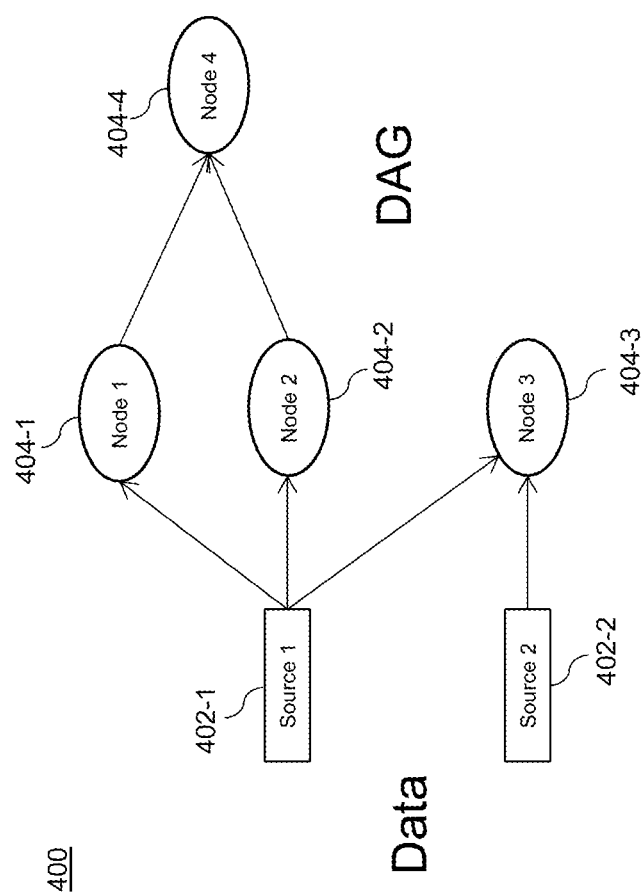
FIG. 4 illustrates a data processing framework that can be employed with embodiments of the invention.

FIG. 4 illustrates a data processing framework 400 that can be employed with embodiments of the invention. As shown, a set of sources 402-1 and 402-2 are coupled to a set of nodes 404-1, . . . , 404-4. It is to be appreciated that the number of sources and nodes shown in FIG. 4 is for illustration purposes only, and thus the number could be greater or fewer depending on the specific implementation that is desired/needed. In an illustrative embodiment, sources 402-1 and 402-2 correspond to a subset of data sources 102-1, 102-2, . . . , 102-N, while nodes 404-1, . . . , 404-4 are implemented as part of framework 210.

By way of one non-limiting example, the processing framework 400 may be implemented using an Apache™ Storm framework (available from the Apache Software Foundation, Los Angeles, Calif.). In such an implementation, sources are referred to as "spouts" and nodes are referred to as "bolts."

It is to be understood that the data (e.g., incoming file content) is provided by each source 402 (spout) which generates a data stream. A given node 404 (bolt) can consume one or more streams and can also generate output data streams that feed one or more other nodes. The nodes 404-1, 404-4 perform processing (functions) on the data streams and can call out to external entities such as, for example, database systems. The route that the data takes from the sources through the nodes forms a directed acyclic graph (DAG). The overall route that data takes can be decided based on logic in the nodes taking into account the content and/or its metadata.

In accordance with illustrative embodiments, a valuation directed acyclic graph (VDAG) is a set of nodes that have been programmed (i.e., configured) to inspect incoming data for purposes of calculating the data's initial value. A VDAG has access to a repository that contains ingest-related valuation information, as will be explained below.

Figure 5:
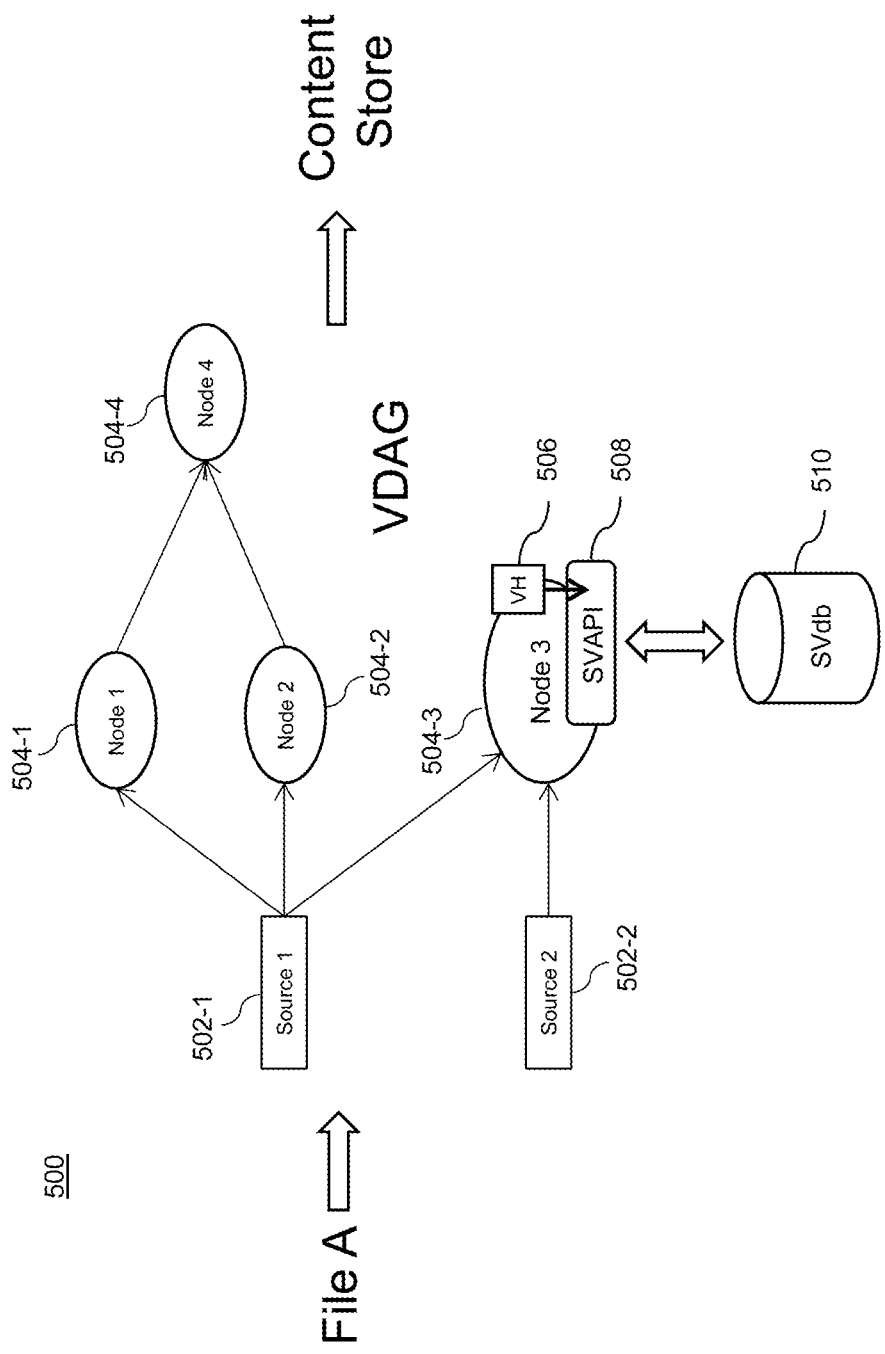
FIG. 5 illustrates a data ingest valuation framework according to an embodiment of the invention.
Figure 6:
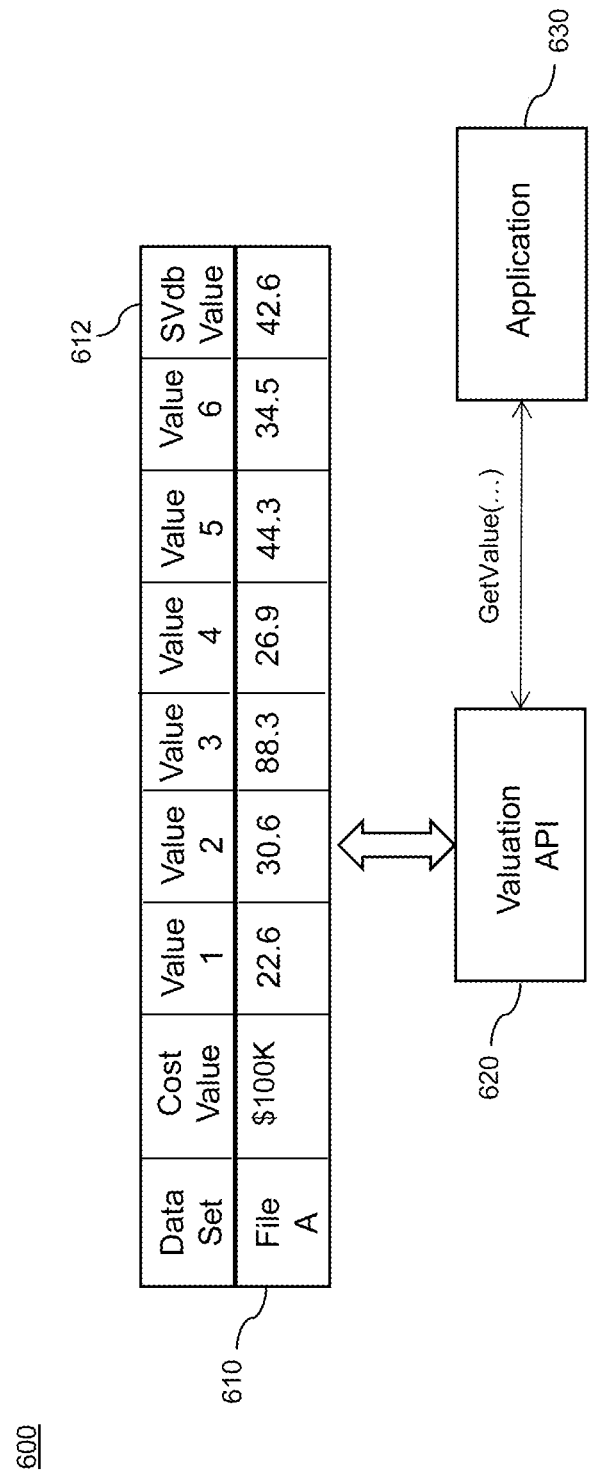
FIG. 6 illustrates a data valuation methodology incorporating data ingest valuation according to an embodiment of the invention.

FIG. 5 illustrates a data ingest valuation framework 500 according to an embodiment of the invention. As shown, a set of sources 502-1 and 502-2 are coupled to a set of nodes 504-1, . . . , 504-4. Again, the number of sources and nodes shown in FIG. 5 is for illustration purposes only, and thus the number could be greater or fewer depending on the specific implementation that is desired/needed.

As content (e.g., file A) flows into the ingest framework, a valuation handle can be created (or retrieved) and used by nodes 504-1, . . . , 504-4 throughout the processing of the incoming content. This valuation handle or VH is a file handle representing the content being evaluated. For example, it is assumed that VH 506 is the file handle for file A.

As the content is received, the VH is provided to a streaming valuation application programming interface or SVAPI 508 that performs a variety of functions. These functions will be described in more detail below.

A streaming valuation database or SVdb 510 is maintained to store ingest-related valuation calculations. This database is maintained alongside the VDAG and, in illustrative embodiment, can be separate from the content store (i.e., the storage system that stores file A). Note that each node 504 can have its own SVAPI and SVdb or two or more nodes 504 can share an SVAPI and/or SVdb. Also, in illustrative embodiments, the data ingest valuation framework can have a single SVAPI and a single SVdb.

Given the architecture described above, inline valuation algorithms are executed that are similar in function to algorithms that are run post-ingest (e.g., a tokenization algorithm as described above in FIG. 3). As the valuation algorithm runs, the nodes 504 utilize the VH 506 for the content (e.g., file A) and the SVAPI logic 508 to record value in real time (i.e., contemporaneous with content ingest) in SVdb 510.

Querying the SVdb allows a business application to obtain immediate insight into the value of a recently ingested file (overcoming limitations described above). As shown in methodology 600 in FIG. 6, a valuation table 610 represents a table stored for file A. Table 610 shows illustrative values computed for a set of data valuation algorithms (i.e., value 1 is an output value that corresponds to a first valuation algorithm, value 2 is an output value that corresponds to a second valuation algorithm, and so on). Also shown is a cost value which represents a cost to the business associated with obtaining file A (e.g., purchase cost). Note that one or more of the valuation algorithms can implement valuation criteria that are standard for and/or required by a specific industry (e.g., data insurance industry). Advantageously, table 610 also includes an output value 612 (SVdb value) that corresponds to a valuation algorithm executed on file A at the time of ingest of file A. Note that the value 612 can be obtained from an SVdb (e.g., SVdb 510), an SVdb can be used to store table 610, or certain columns of table 610 can be used as an SVdb.

As further shown, a valuation API (e.g., a SVAPI such as SVAPI 508 or some other higher level API) can fetch a value for file A based on a query from an application 630. This valuation API can be used to fetch the latest view of value from the point of view of the VDAG ecosystem. In one non-limiting example, application 630 can be a data insurance quote generation engine, which utilizes the SVdb value to determine how file A impacts data insurance premiums.

It is realized herein that an ingest processing application (e.g., part of data ingest interface 112 in FIG. 1) can inspect an incoming content stream and perform correlation activity against previously ingested content. One example of such an ingest processing application is the InfoArchive™ system, available from EMC Corporation, Hopkinton, Mass. For example, assume file C arrives to a VDAG framework after file A and file B have been processed. The ingest processing application can extract metadata from file C, consult its internal database, and deduce that file A has a strong correlation to file C.

Figure 7:
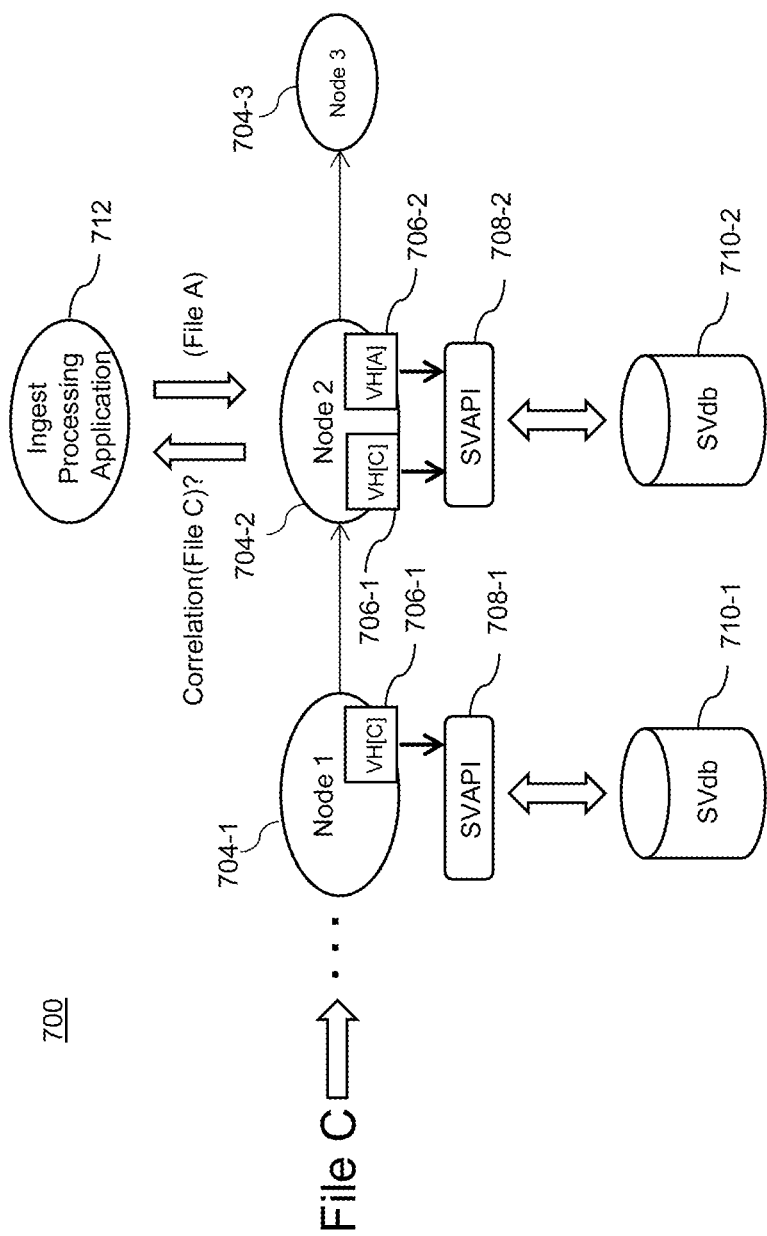
FIG. 7 illustrates a data correlation valuation framework according to an embodiment of the invention.

FIG. 7 illustrates such a data correlation valuation framework 700 according to an embodiment of the invention. As shown, a set of nodes 704-1, . . . , 704-4 receive file C (the source of file C is not expressly shown but understood to be coupled to node 704-1). One or more of the nodes are programmed to first perform a tokenized form of valuation on file C. For example, node 704-1 performs this operation and calls SVAPI 708-1 with the valuation handle for C (VH[C] 706-1). The SVAPI 708-1 then executes the logic to calculate a new valuation score for file C and records it into SVdb 710-1.

As execution passes to node 704-2, correlation logic of ingest processing application 712 (e.g., InfoArchive™ system) is executed, resulting in the discovery that file A correlates to file C. This causes the fetching of valuation handles for both A (706-2) and C (706-1), and SVAPI 708-2 makes appropriate updates to the current values of A and C in SVdb 710-2 before passing the stream to node 704-3. Note that while separate instances of SVAPI and SVdb are shown in FIG. 7 for each of nodes 704-1 and 704-2, two or more nodes may share the same SVAPI and/or SVdb.

Figure 8:
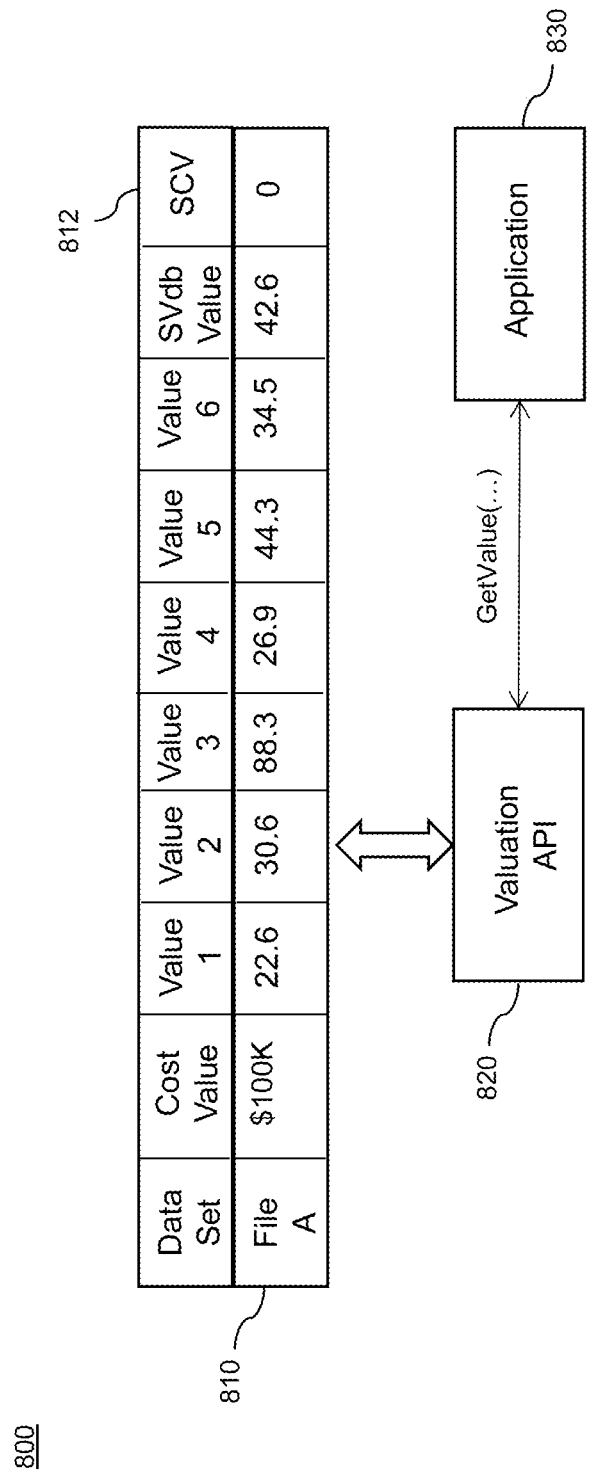
FIG. 8 illustrates a data valuation methodology incorporating data correlation valuation according to an embodiment of the invention.

It is realized that it may be beneficial to keep different valuation tallies for the initial ingest value and any correlation value while streaming data at ingest. For example, the correlation value can be tracked separately from the initial ingest value. FIG. 8 shows such a methodology 800, wherein a valuation table 810 is queried through a valuation API 820 by a business application 830 in a similar way as described above for methodology 600 in FIG. 6. However, in table 810, a streaming correlation value (SCV) is separately maintained, e.g., SCV 812. In this example, SCV is zero, meaning the content of file C has no or low correlation with respect to file A.

It is to be appreciated that deep or shallow machine learning algorithms can be used to calculate valuations with an increased accuracy over time in highly dynamic environments, e.g., such as with data environments where many files are received in very short time periods and correlation between many of the files is high.

Figure 9:
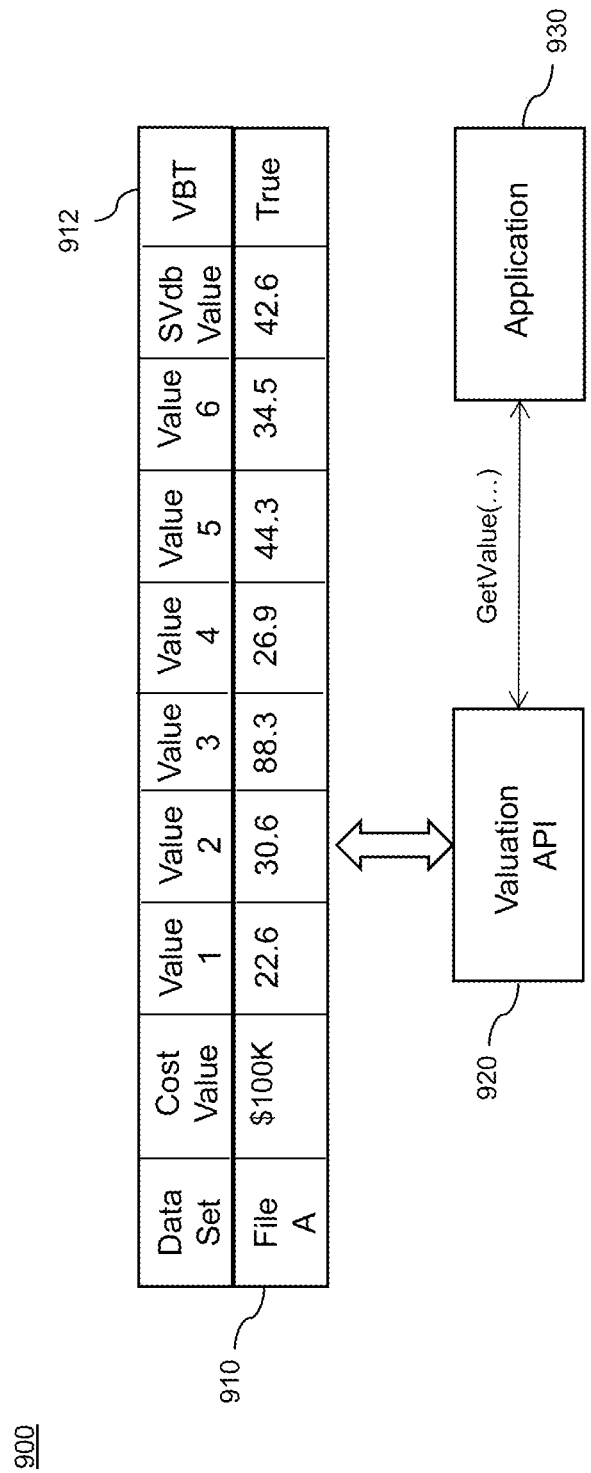
FIG. 9 illustrates a data valuation methodology incorporating data valuation before transformation according to an embodiment of the invention.

Referring back to FIG. 7, assume that node 704-3 contains encryption or masking transformation logic, then the ingest logic (processing nodes prior to node 704-3) has successfully calculated value before the transformation takes place. In accordance with illustrative embodiments, as node 704-3 performs transformation, it also can be configured to call to the SVAPI (708-1, 708-2, or the single SVAPI when there is only one instance) and flag the fact that the data is being transformed. This flag informs subsequent calls to the valuation API that the data was indeed valued before the transformation. FIG. 9 illustrates such a data valuation methodology 900 incorporating a mechanism for flagging data valuation before transformation, wherein a valuation table 910 is queried through a valuation API 920 by a business application 930 in a similar way as described above for methodology 600 in FIG. 6. However, in table 910, a valuation before transformation flag value is separately maintained, e.g., VBT 912. For example, assume a call from node 704-3 updates the VBT flag to indicate that the SVdb value (next to it in table 910) was calculated before file A was encrypted (i.e., set the VBT flag as "true"). The knowledge that the data has been valued before transformation can allow a business application to de-emphasize certain values (e.g., in-place or post-ingress tokenization) and instead emphasize streaming valuation calculations.

Furthermore, nodes can be programmed to recognize certain file types or keywords and callouts to an ingest processing application (e.g., InfoArchive™ database) can associate the content with any number of regulations and/or corporate policies. By way of example only, financial trading records could trigger retention policies, medical records could trigger HIPPA (Health Insurance Portability and Accountability Act) policies, etc. Each time a regulation or policy is associated, the VDAG can add programmatic support to increase valuation scores (either the total valuation score and/or policy/specific valuations).

Using this approach, the value of content can rise and fall based on the logic described above. The data ingest valuation techniques described herein support the ability to track fluctuations in value across a specific time period and call trigger routines (e.g., email, graphical user interface alerts, business logic, etc.) based on these fluctuations. Also, real-time valuation can enforce decisions to reroute valuation refinement using business process engines for human input.

Recall that FIG. 5 depicts that eventually the content (transformed or not) comes out the other end (right side in FIG. 5) of the VDAG and into the content store. Using the data ingest valuation techniques described herein, the final value, or a set of valuation results, can be used to establish placement of the content based on value.

The above and other functions (e.g., triggering, valuation refinement, utilization with business processes, content placement decisions, etc.) can be implemented by one or more nodes of the data ingest valuation framework (e.g., 210 in FIG. 2) described herein.

By way of one non-limiting use case example, consider a financial company that is required to protect all emails, notes, voice conversations, and other electronic assets that pertain to a specific trade. Assume that voice mail records come into a data ingest valuation system (e.g., FIG. 7) and are routed to a given node X. This node can use the following valuation pseudo-code to calculate streaming correlation value (SCV):

VH=getValuationHandle(voice_mail.url( ));
ValuationAPI.clearSCV(VH);
SCV=0
If (voice_mail.date( )!=NULL)
{
SCV++; // knowing the date helps
}
If (voice_mail.trader( )!=NULL)
{
if (voice_mail.stock( )==NULL)
    SCV+=5; // knowing the trader name helps
Else
    SCV+=10; // knowing the trader name and stock helps
        even more
}
// insert other valuation test here . . . .
ValuationAPI.storeSCV(SCV);

Once all ingest is completed, a compliance team can easily find "low value" voice mails, listen to the recordings, tag the voice mail with discovered dates, stocks, and traders, and adjust the content manually. Alternatively, voice recognition can be used to try and extract those values.

Figure 10:
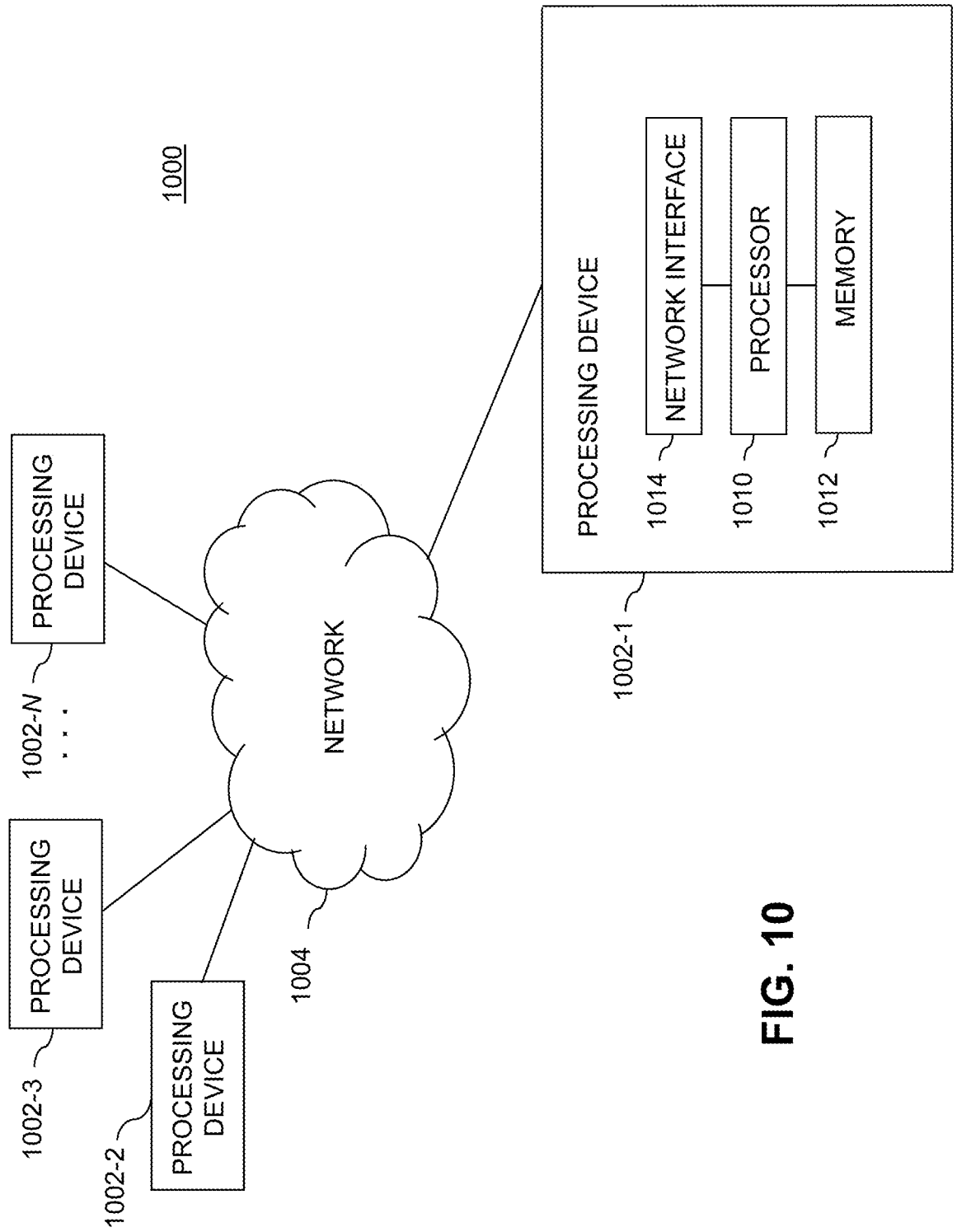
FIG. 10 illustrates a processing platform used to implement a data valuation framework according to an embodiment of the invention.

As an example of a processing platform on which a data valuation framework environment (as shown in FIGS. 1-9) according to illustrative embodiments can be implemented is processing platform 1000 shown in FIG. 10. The processing platform 1000 in this embodiment comprises a plurality of processing devices, denoted 1002-1, 1002-2, 1002-3, . . . 1002-N, which communicate with one another over a network 1004. It is to be appreciated that the data valuation methodologies described herein may be executed in one such processing device 1002, or executed in a distributed manner across two or more such processing devices 1002. Thus, the framework environment may be executed in a distributed manner across two or more such processing devices 1002. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 10, such a device comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device, such as the processing device 1002-1, causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, ... 1002-N) of the processing platform 1000 are assumed to be configured in a manner similar to that shown for processing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1000 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
   obtaining a given data set as the given data set is ingested by a data storage system;
   calculating a valuation for the given data set at the time of ingestion by the data storage system with at least one valuation processing node of a valuation framework to obtain a first valuation for the given data set;

determining whether the given data set correlates with one other ingested data set and calculating, at the time of ingestion and with at least one correlation processing node of the valuation framework, a correlation value representative of a correlation between the given data set and the one other ingested data set, the correlation value being independent of the first valuation;

updating, at the time of ingestion, the first valuation for the given data set based upon the correlation value and a valuation for the one other ingested data set to obtain an updated valuation for the given data set; and storing at least one of the first valuation, the updated valuation and the correlation value in at least one valuation database;

wherein the obtaining, calculating, determining, updating and storing steps are performed by one or more processing devices, each processing device comprising a processor and a memory.

2. The method of claim 1, further comprising accessing the valuation database via an application programming interface.

3. The method of claim 1, further comprising assigning a valuation handle to the given data set upon ingestion by the data storage system.

4. The method of claim 1, wherein the given data set is ingested by the data storage system as a data stream.

5. The method of claim 4, wherein calculating a valuation is performed on the given data set as the data set streams into the data storage system.

6. The method of claim 5, wherein calculating a valuation is performed on the content of the streaming data set.

7. The method of claim 1, further comprising:
receiving a query corresponding to the given data set; and
returning the calculated valuation for the given data set in response to the query.

8. The method of claim 1, further comprising updating the valuation of the one other ingested data set based on the first valuation of the given data set and the correlation value.

9. The method of claim 8, wherein updating the valuation of the one other ingested data set is performed on the other ingested data set as the data set streams into the data storage system.

10. The method of claim 1, wherein calculating a valuation comprises machine learning based valuation processes.

11. The method of claim 1, wherein calculating a valuation is performed on the given data set prior to transformation of the given data set.

12. The method of claim 11, wherein the storing step includes flagging the first valuation in the at least one valuation database as a calculation performed prior to transformation of the given data set.

13. The method of claim 1, wherein calculating a valuation is based on a given data policy.

14. The method of claim 1, further comprising:
monitoring fluctuations in calculated valuations for data sets ingested by the data storage system over a given time period; and
triggering one or more actions to be performed based on the monitored fluctuations.

15. The method of claim 1, further comprising determining placement of the given data set in the data storage system based on at least one of the first valuation and the updated valuation.

16. The method of claim 1, wherein calculating a valuation is performed by one or more processing nodes interconnected to form a directed acyclic graph.

17. An article of manufacture comprising a processor-readable storage medium having encoded therein executable code of one or more software programs, wherein the one or more software programs when executed by one or more processing devices implement steps of:

obtaining a given data set as the given data set is ingested by a data storage system;

calculating a valuation for the given data set at the time of ingestion by the data storage system with at least one valuation processing node of a valuation framework to obtain a first valuation for the given data set;

determining whether the data set correlates with one other ingested data set and calculating, at the time of ingestion and with at least one correlation processing node of the valuation framework, a correlation value representative of a correlation between the given data set and the one other ingested data set, the correlation value being independent of the first valuation;

updating the first valuation for the given data set based upon the correlation value and a valuation for the one other ingested data set to obtain an updated valuation for the given data set; and storing at least one of the first valuation, the updated valuation and the correlation value in at least one valuation database.

18. The article of manufacture of claim 17 wherein the one or more software programs when executed by one or more processing devices implement steps of:
as the data set streams into the data storage system, updating the valuation of the one other ingested data set based on the first valuation of the given data set and the correlation value.

19. A system comprising:
one or more processors operatively coupled to one or more memories configured to:
obtain a given data set as the given data set is ingested by a data storage system;
calculate a valuation for the given data set at the time of ingestion by the data storage system with at least one valuation processing node of a valuation framework to obtain a first valuation for the given data set;
determine whether the given data set correlates with one other ingested data set and calculate, at the time of ingestion and with at least one correlation processing node of the valuation framework, a correlation value representative of a correlation between the given data set and the one other ingested data set, the correlation value being independent of the first valuation;
update the first valuation for the given data set based upon the correlation valuation and a valuation for the one other ingested data set to obtain an updated valuation for the given data set; and
store at least one of the first valuation, updated valuation and the correlation value in at least one valuation database.

20. The system of claim 19 wherein the one or more processors are configured to:
update the valuation of the one other ingested data set based on the first valuation of the given data set and the correlation value.

* * * * *